US009104777B2

(12) United States Patent
Borodin et al.

(10) Patent No.: US 9,104,777 B2
(45) Date of Patent: Aug. 11, 2015

(54) METHOD FOR IMPROVING ACCESSIBILITY TO RICH INTERNET APPLICATIONS THROUGH COLLABORATIVE CRAWLING AND COMPUTER PROGRAM FOR THE SAME

(75) Inventors: Yevgen Borodin, Stony Brook, NY (US); Shinya Kawanaka, Kanagawa (JP); Hironobu Takagi, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 13/262,252

(22) PCT Filed: Mar. 30, 2010

(86) PCT No.: PCT/JP2010/055732
§ 371 (c)(1),
(2), (4) Date: Nov. 3, 2011

(87) PCT Pub. No.: WO2010/113962
PCT Pub. Date: Oct. 7, 2010

(65) Prior Publication Data
US 2012/0054272 A1 Mar. 1, 2012

(30) Foreign Application Priority Data
Apr. 3, 2009 (JP) .................................. 2009-091450

(51) Int. Cl.
*G06F 15/173* (2006.01)
*G06F 17/30* (2006.01)
(Continued)

(52) U.S. Cl.
CPC ...... *G06F 17/30899* (2013.01); *H04L 12/2692* (2013.01); *H04L 41/06* (2013.01); *H04L 41/0631* (2013.01); *H04L 43/16* (2013.01)

(58) Field of Classification Search
CPC .............. G06F 17/30899; H04L 41/06; H04L 41/0631; H04L 43/16; H04L 12/2692
See application file for complete search history.

(56) References Cited

U.S. PATENT DOCUMENTS 7,036,079 B2    4/2006  McGlinchey et al.
7,774,378 B2 *  8/2010  Nelson .......................... 707/803
(Continued)

FOREIGN PATENT DOCUMENTS

CN    1969272 A    5/2007
CN    1987862 A    6/2007
(Continued)

OTHER PUBLICATIONS

H. Miyashita, et al., "Al Browser for Multimedia: Introducing Multimedia Content Accessibility for Visually Impaired Users", in Proceedings of the 9th international ACM SIGACCESS conference on Computers and accessibility, 2007, ACM: Tempe, Arizona. USA.
(Continued)

*Primary Examiner* — Dhairya A Patel
(74) *Attorney, Agent, or Firm* — Scully, Scott,Murphy & Presser, P.C.; Jennifer R. Davis, Esq.

(57) ABSTRACT

A method and article of manufacture of making dynamic content more accessible to screen readers and web spiders. The method applies to a server connected to a client via a network. The method includes receiving from the client an action event indicative of an action performed by a user on content displayed on the client and a change event indicative of a change in the content. The method further includes generating metadata for improving accessibility to the content based on the action event and the change event.

15 Claims, 9 Drawing Sheets

(51) Int. Cl.
*H04L 12/26* (2006.01)
*H04L 12/24* (2006.01)

(56) References Cited

U.S. PATENT DOCUMENTS

| | | | |
|---|---|---|---|
| 2003/0225825 A1 | 12/2003 | Healey | |
| 2004/0255270 A1* | 12/2004 | McGlinchey et al. | 717/109 |
| 2007/0150556 A1 | 6/2007 | Fukuda | |
| 2008/0215170 A1* | 9/2008 | Milbrandt et al. | 700/94 |
| 2009/0030996 A1 | 1/2009 | Saito et al. | |
| 2009/0081950 A1 | 3/2009 | Matsubara et al. | |
| 2009/0100328 A1 | 4/2009 | Asakawa et al. | |
| 2009/0167520 A1* | 7/2009 | Watanabe et al. | 340/507 |
| 2011/0270929 A1* | 11/2011 | Harrang et al. | 709/205 |

FOREIGN PATENT DOCUMENTS

| | | |
|---|---|---|
| JP | 2008-506183 A | 2/2009 |
| JP | 2009-031960 A | 2/2009 |
| JP | 2009-093521 A | 4/2009 |

OTHER PUBLICATIONS

G. Frey, "Indexing AJAX Web Applications". ETH Department of Computer Science. Institute of Computational Sciences (2007), Available from: http://e-collection.ethbib.ethz.ch/view/eth:30111.

A. Mesbah, et al., "Crawling AJAX by Inferring User Interface State Changes",2008, ICWE, Yorktown Heights, NY, USA.

Y. Borodin, et al., "What's New?—Making Web Page Updates Accessible".to appear in proceedings of the 10th international ACM SIGACCESS conference on Computers and accessibility. 2008. ACM. Nova Scotia, Canada.

S. Kawanaka, et al,. "Accessibility Commons: A Metadata Infrastructure for Web Accessibility", to appear in the proceedings of ASSETS. 2008. Halifax, Canada.

H. Takagi, el al., "Social Accessibility; Achieving Accessibility through Collaborative Metadata Authoring", Proceedings of ASSETS 2008: The 10th International ACM SIGACCESS Conference on Computers and Accessibility. 2008. Halifax, Canada, pp. 193-200.

H. Miyashita.et al. "Multimedia Content Formats in Depth: How Do They Make Interactive Broadcast/Communication Services Possible? (4); Declarative Data Format (3)—Document Object Model (DOM)/Scripting Language—", The Journal of The Institute of Image Information and Television Engineers, vol. 61, No. 4, pp. 453-458 (2006).

T. Ishihara et al., "An Interface for Blind Person Using Meta-Data of Presentation Documents", Forum on Information Technology, 2006, pp. 519-522.

T. Ishihara et al., "Analyzing Visual Layout for a Non-Visual Presentation-Document Interface," ASSETS'06, Oct. 22-25, 2006, Portland, OR,(English related reference of np8).

HTTP://www.w3.org/TR/2000/REC-DOM-Level-2-Events-20001113/DOM2-Events.pd, Internet Citation, [Online], XP002400292, Sep. 18, 2006.

Letter from IBM China which indicates that the date of the issued Official Action is Jul. 1, 2013.

Matsuda, R. et al, "Web Accessibility of Dynamic Web sites which use JavaScript", IEICE Technical Report WIT2007-52, The Institute of Electronics Information and Communication Engineers, vol. 107 No. 368, p. 111-118.

Letter from IBM Japan which indicates that the date of the issued Official Action is Aug. 20, 2013.

\* cited by examiner

METHOD FOR IMPROVING ACCESSIBILITY TO RICH INTERNET APPLICATIONS THROUGH COLLABORATIVE CRAWLING AND COMPUTER PROGRAM FOR THE SAME

CROSS-REFERENCE TO RELATED APPLICATIONS

This is a U.S. National Stage application under 35 U.S.C. §317 based on International Application No. PCT/JP2010/055732, filed Mar. 30, 2010, published under PCT Article 21 (2) on Oct. 7, 2010 as WO/2010/113962, which claims priority from Japanese Patent Application No. 2011-507225 filed Mar. 30, 2010 which in turn claims priority from Japanese Patent Application No. 2009-091450 filed Apr. 3, 2009. The entire contents of all the above applications are incorporated herein by reference.

TECHNICAL FIELD

The present invention relates to a technique for improving accessibility to web content and is directed to dynamic web content in particular.

BACKGROUND OF THE INVENTION

In the World Wide Web, there has been a gradual shift from static to dynamic content. Dynamic web content is created by using such techniques as DHTML, AJAX, and Flash, for instance. Such dynamic content enables web applications to provide users with experience of richer interaction and response.

NON-PATENT DOCUMENT 1

Miyashita, H., et al., Ai browser for multimedia: introducing multimedia content accessibility for visually impaired users, in Proceedings of the 9th international ACM SIGACCESS conference on Computers and accessibility. 2007, ACM: Tempe, Ariz., USA

NON-PATENT DOCUMENT 2

Frey, Gianni; Indexing AJAX Web Applications; ETH Department of Computer Science, Institute of Computational Sciences (2007). Available from: http://e-collection.ethbib.ethz.ch/view/eth:30111

NON-PATENT DOCUMENT 3

Ali Mesbah, Engin Bozdag, and Arie van Deursen., Crawling AJAX by Inferring User Interface State Changes. 2008, ICWE, Yorktown Heights, N.Y., USA Miyashita, H., et al., Ai browser for multimedia: introducing multimedia content accessibility for visually impaired users, in Proceedings of the 9th international ACM SIGACCESS conference on Computers and accessibility. 2007, ACM: Tempe, Ariz., USA.

NON-PATENT DOCUMENT 4

Borodin, Y., Bigham, J. P., Raman, R., Ramakrishnan, I. V., What's New?—Making Web Page Updates Accessible. To appear in Proceedings of the 10th international ACM SIGACCESS conference on Computers and accessibility. 2008, ACM: Nova Scotia, Canada

NON-PATENT DOCUMENT 5

Kawanaka, S., Borodin Y., Bigham, J., Lunn, D., Takagi, Hironobu, Asakawa, C., Accessibility Commons: A Metadata Infrastructure for Web Accessibility; to appear in the proceedings of ASSETS, 2008; Halifax, Canada.

NON-PATENT DOCUMENT 6

Takagi, H., S. Kawanaka, and M. Kobayashi. Social Accessibility: Achieving Accessibility through Collaborative Metadata Authoring; to appear in the proceedings of ASSETS, 2008; Halifax, Canada.

Rich web applications, however, have such a disadvantage as follows. Dynamic content is not fully accessible firstly to users who recognize web content aurally using a screen reader (e.g., visually-impaired persons) and secondly to web spiders (used by web search engines) that crawl the Web and create indices for web content. In the conventional static Web, individual web pages are reachable via static links, so screen readers and web spiders can exercise their capabilities by identifying static links in HTML source code. The state of a Rich Internet Application or RIA, however, is implicit, is determined by user action and changes according to user action. Such content cannot be fully accessed by screen readers or web spiders.

The present invention has been made in view of this disadvantage, and an object thereof is to provide a technique for making dynamic content more accessible to screen readers and web spiders. Other techniques and references pertaining to similar objects are listed above as Non-Patent Documents.

BRIEF SUMMARY OF THE INVENTION

The present invention can be any one of a method for application to a client, a method for application to a server, and a method for application to a client-server system. In a first aspect, the invention provides a method for application to a client connected with a server via a network, the method including the steps of tracking an action event indicative of an action performed by a user on content displayed on the client and a change event indicative of a change in the content, and generating metadata for improving accessibility to the content based on the action event and the change event. In a second aspect, the invention provides a method for application to a server connected with a client via a network, the method including the steps of receiving from the client an action event indicative of an action performed by a user on content displayed on the client and a change event indicative of a change in the content, and generating metadata for improving accessibility to the content based on the action event and the change event. In a third aspect, the invention provides a method for application to a client-server system in which a client and a server are connected with each other via a network, the method including the steps of tracking, on the client, an action event indicative of an action performed by a user on content displayed on the client and a change event indicative of a change in the content, receiving the action event and the change event from the client on the server, and generating, on the server, metadata for improving accessibility to the content based on the action event and the change event.

According to further aspects of the invention, the steps of transmitting the metadata from the client to the server and receiving the metadata from the server in response to the client requesting a web server to transmit the content may be further included. The client may further include a display device, a pointing device, and a communication device, and the steps of displaying content transmitted from the web server via the network on the display device through the communication device and operating on the content displayed on the display device in response to the user manipulating the pointing device may be further included. The metadata can improve accessibility to the content for a screen reader or a web spider.

The change event may occur in response to the action event or independently of the action event.

In yet another aspect of the invention, the step of generating the metadata may generate metadata that indicates relationship between the action event and the change event, metadata that indicates a type of the content, or both of them.

In a further aspect of the invention, the step of generating the metadata may generate the metadata based on a sequence of the action event and the change event, in which case the metadata may be generated based on a sequence that has occurred more or most frequently among multiple sequences.

Specifically, the action performed by the user on the content may be placing a pointer on the content, and the change in the content may be that new content is displayed in addition to the content. The content may be an element of a hierarchical menu, and the new content may be a submenu included in the element. The action performed by the user on the content may be clicking on the content, the change in the content may be a change in an attribute of the content, and the step of generating the metadata may generate metadata which indicates that the content is a checkbox provided that the clicking and the change in the attribute have been repeated multiple times.

Information identifying the content as a target may be included in the metadata. The information identifying the content may include a wildcard URL and/or a wildcard Xpath.

In another aspect of the invention, an article of manufacture tangibly embodying computer readable instructions which, when implemented, cause a server, a client or a client-server system, to carry out the aforementioned steps. The article of manufacture tangibly embodying computer readable instructions executable by a client may be provided in the form of a plug-in for a web browser, for example. The invention can also be perceived as a client, a server, or a client-server system that performs the aforementioned steps.

According to an aspect of the invention, a technique for making dynamic content more accessible to screen readers and web spiders can be provided.

DETAILED DESCRIPTION OF THE INVENTION

Figure 1:
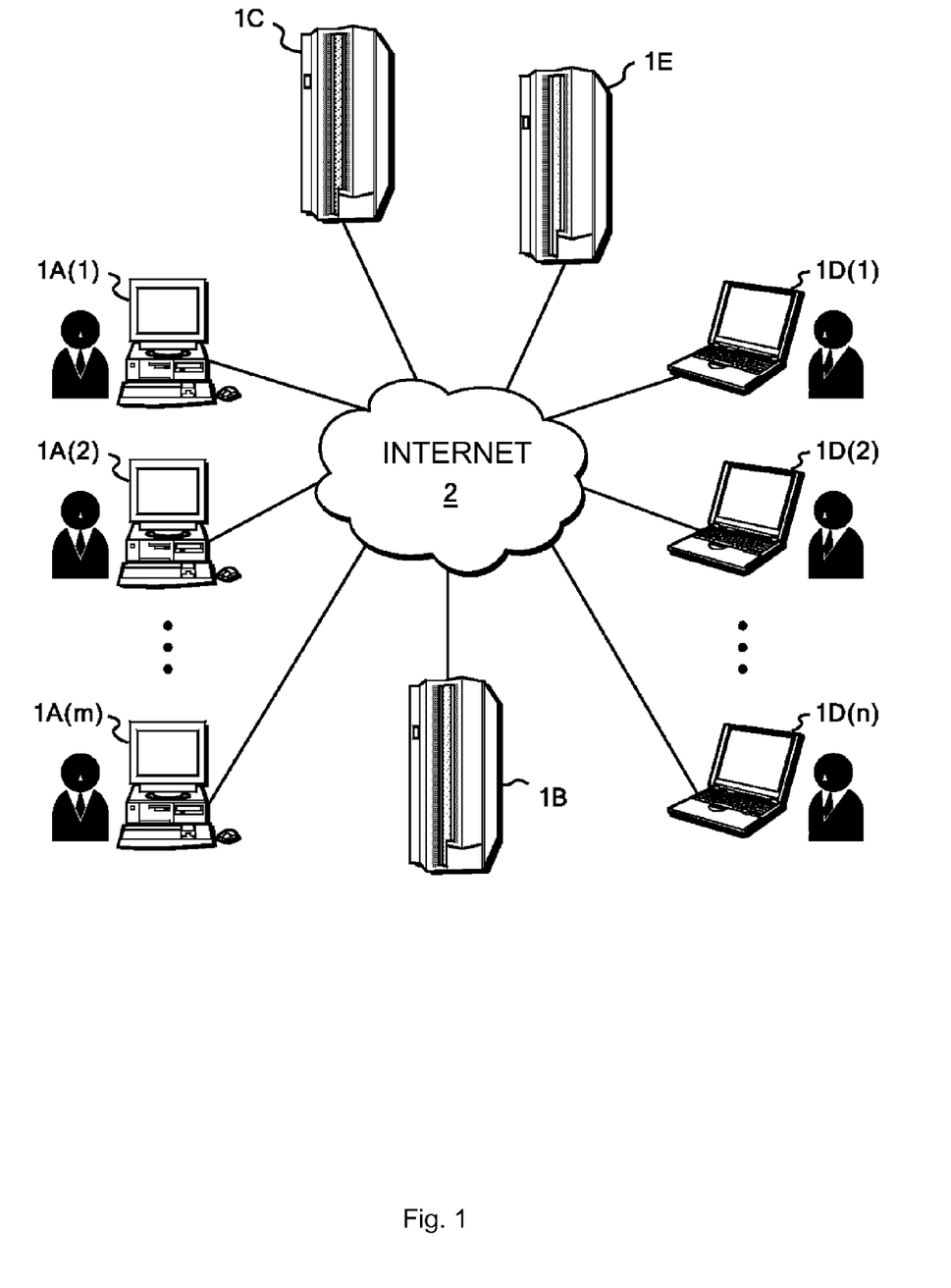
FIG. 1 is a schematic diagram showing an overall structure of a system according to an embodiment of the invention.

FIG. 1 is a schematic diagram showing an overall configuration of a system, in which multiple computer systems are interconnected such that the systems can communicate with each other via the Internet (a network). The computer systems are classified into general client computers (clients) 1A(1) to 1A(m), an accessibility server (a separate computer) 1B, a web server (a server) 1C, screen-reader client computers 1D(1) to 1D(n), and a search server 1E.

Figure 2:
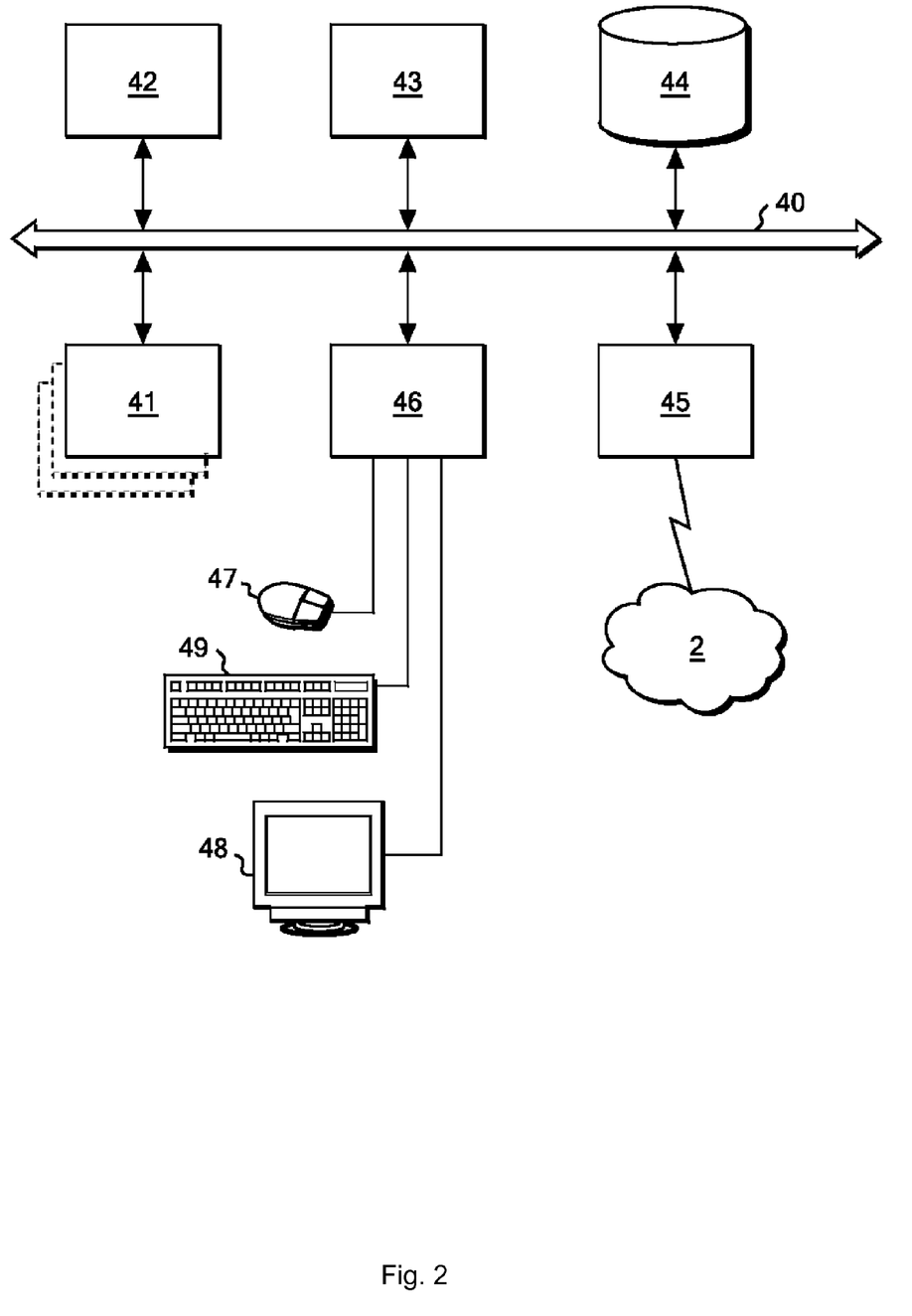
FIG. 2 is a block diagram illustrating a typical hardware configuration of a computer system.

FIG. 2 is a block diagram illustrating a typical hardware configuration of a computer system. The computer system includes a (low- and high-speed) bus 40, a Central Processing Unit (CPU) 41 connected to the bus, Random Access Memory (RAM) 42, Read-Only Memory (ROM) 43, a Hard Disk Drive (HDD) 44, a communication interface (a communication device) 45, and an input/output interface 46. The computer system also includes a mouse (a pointing device) 47, a CRT display (a display device) 48, and a keyboard 49, which are connected to the input/output interface 46. While the computer system is described as adopting a personal computer architecture, the servers 1B, 1C and 1E may have the CPU 41 and/or HDD 44 multiplexed for higher data processing capability and usability, for example. The functions of each of the servers 1B, 1C and 1E may be realized by more than one computer system. For the general client computers (clients) 1A(1) to 1A(m) and the screen-reader client computers 1D(1) to 1D(n), various types of computer system, such as Personal Digital Assistant (PDA) and smartphone, may be adopted.

Figure 3A:
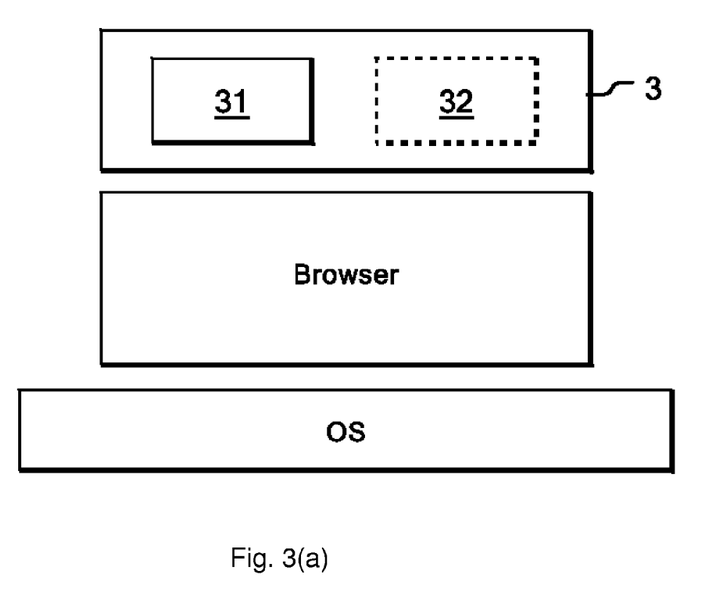
FIG. 3 is a block diagram illustrating a software configuration of a client computer.
Figure 3B:
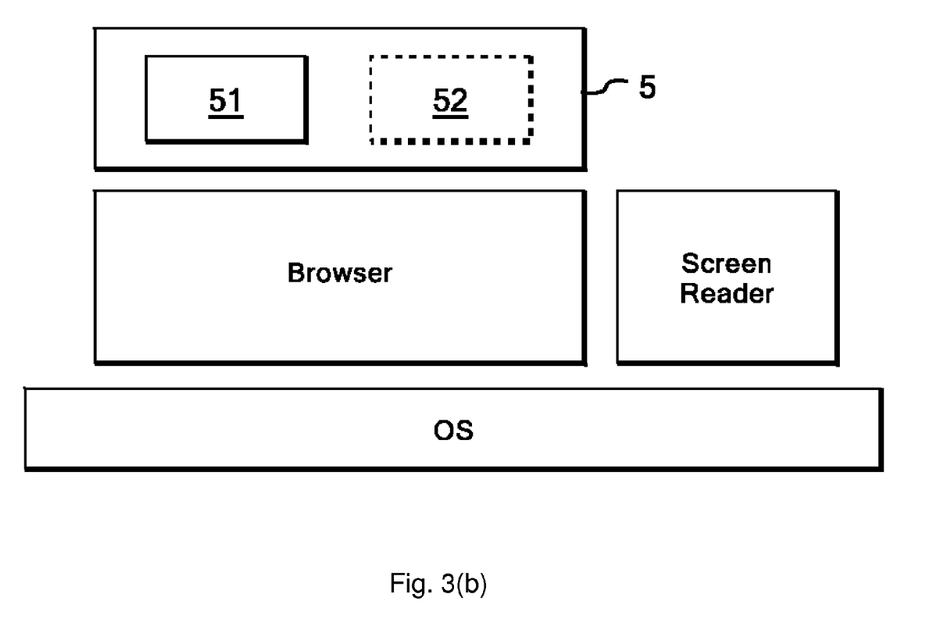

FIGS. 3(a) and 3(b) are block diagrams illustrating software configurations of the general client computers (clients) 1A(1) to 1A(m) and the screen-reader client computers 1D(1) to 1D(n), respectively. Both types of client computers have an operating system (OS) to provide basic functions and a web browser as application software that utilizes the OS functions. By way of example, if both types of client computers are notebook or desktop personal computers, they include an operating system like Microsoft Windows® (a trademark) and a web browser such as Internet Explorer (a trademark) and Firefox (a trademark). On the general client computers (clients) 1A(1) to 1A(m), plug-in software 3 for the web browser is installed. The plug-in software 3 includes a tracer 31 and an analyzer 32. The functions of the analyzer 32 may alternatively be provided by the accessibility server (a separate computer) 1B. Plug-in software 5 for the web browser is installed also on the screen-reader client computers 1D(1) to 1D(n). The plug-in software 5 includes a transcoder 51. The screen-reader client computers 1D(1) to 1D(n) also have a screen reader as application software.

Based on the hardware and software configurations, client computer functions described below are realized: the software applications are loaded into the RAM 42 and executed by the CPU 41.

Figure 4:
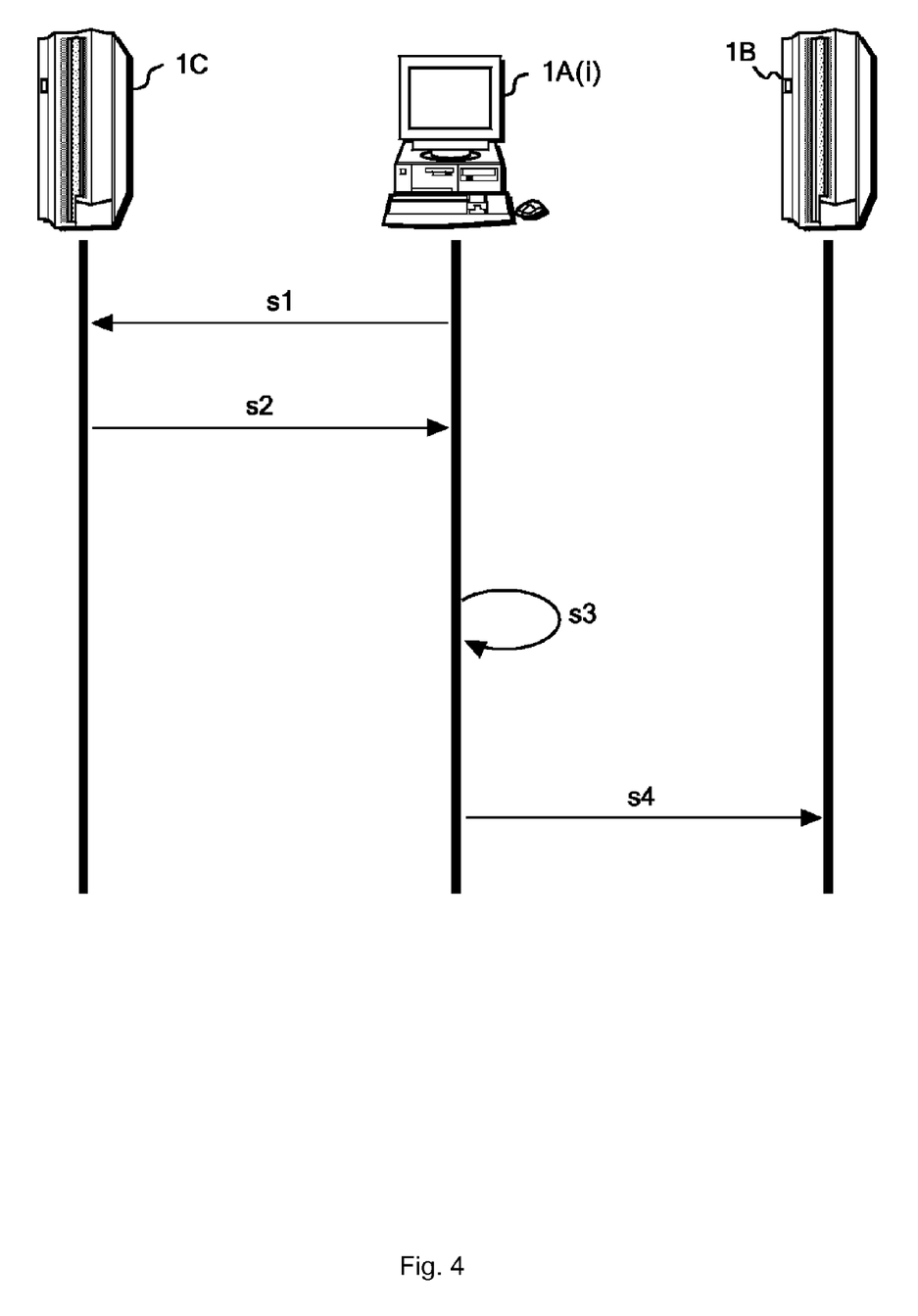
FIG. 4 is a timing chart showing an overall flow of metadata generation and registration.
Figure 5:
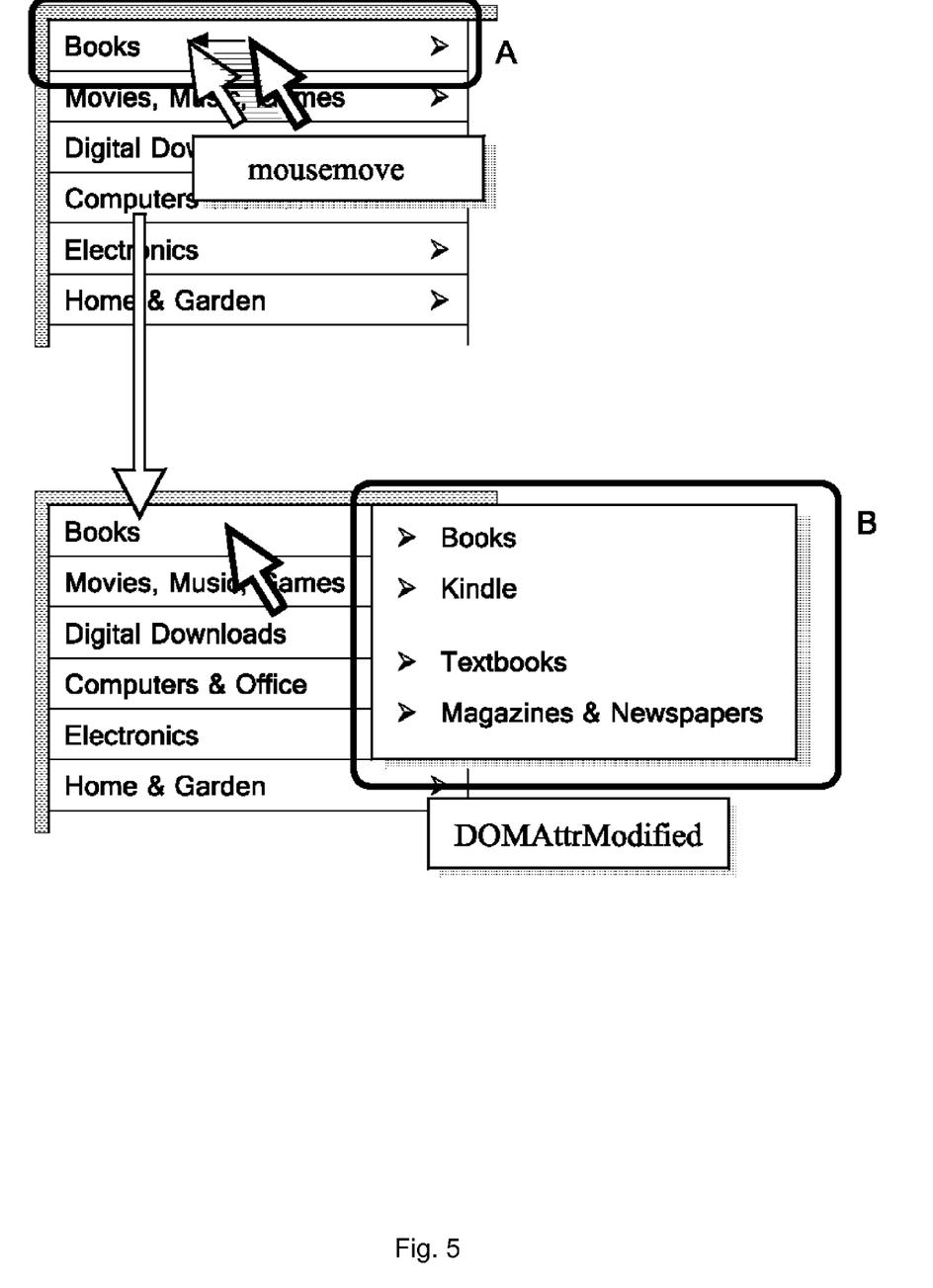
FIG. 5 shows how a user manipulates a dynamic menu as an illustration of metadata generation.
Figure 6:
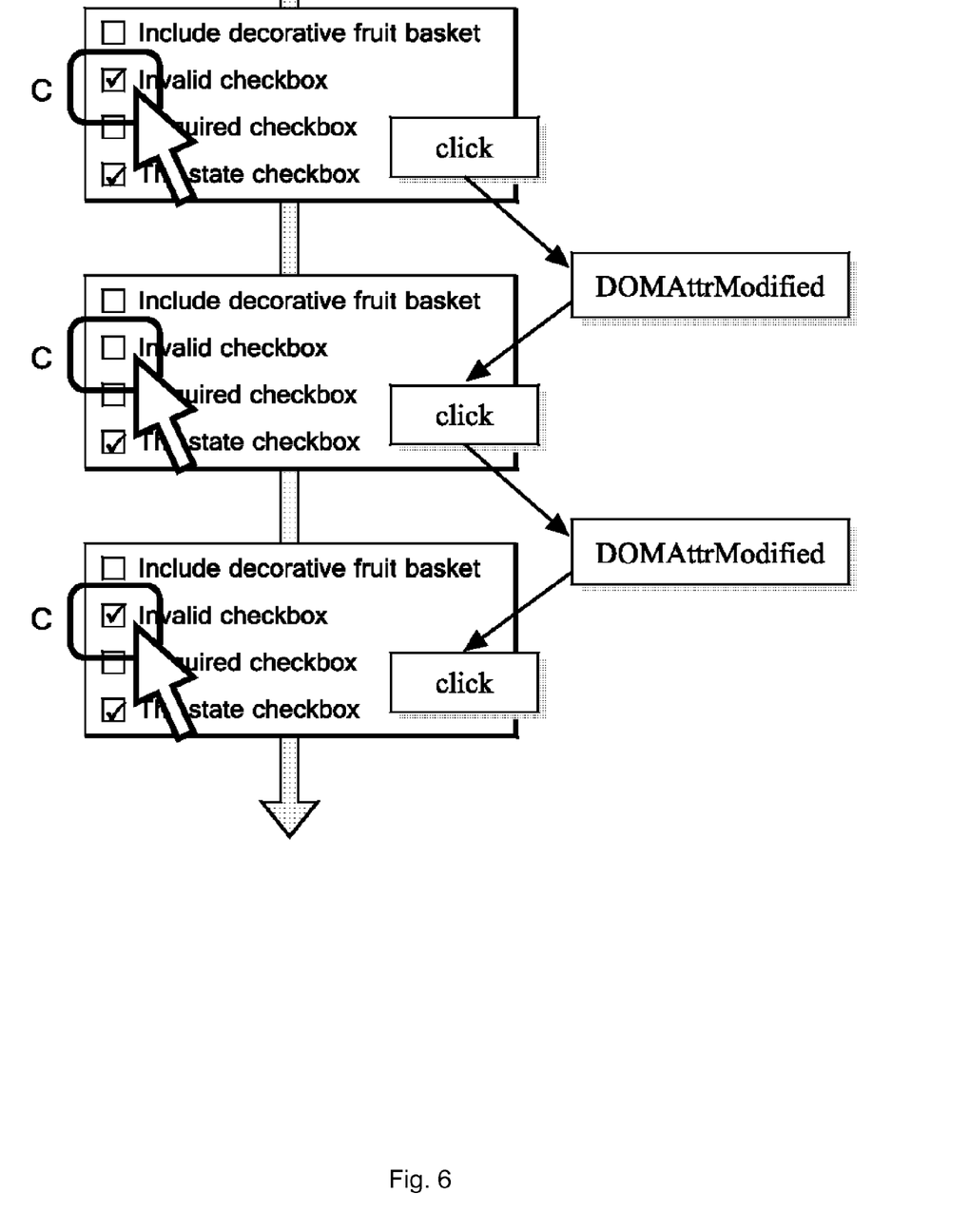
FIG. 6 shows how a user manipulates a checkbox as an illustration of metadata generation.
Figure 7:
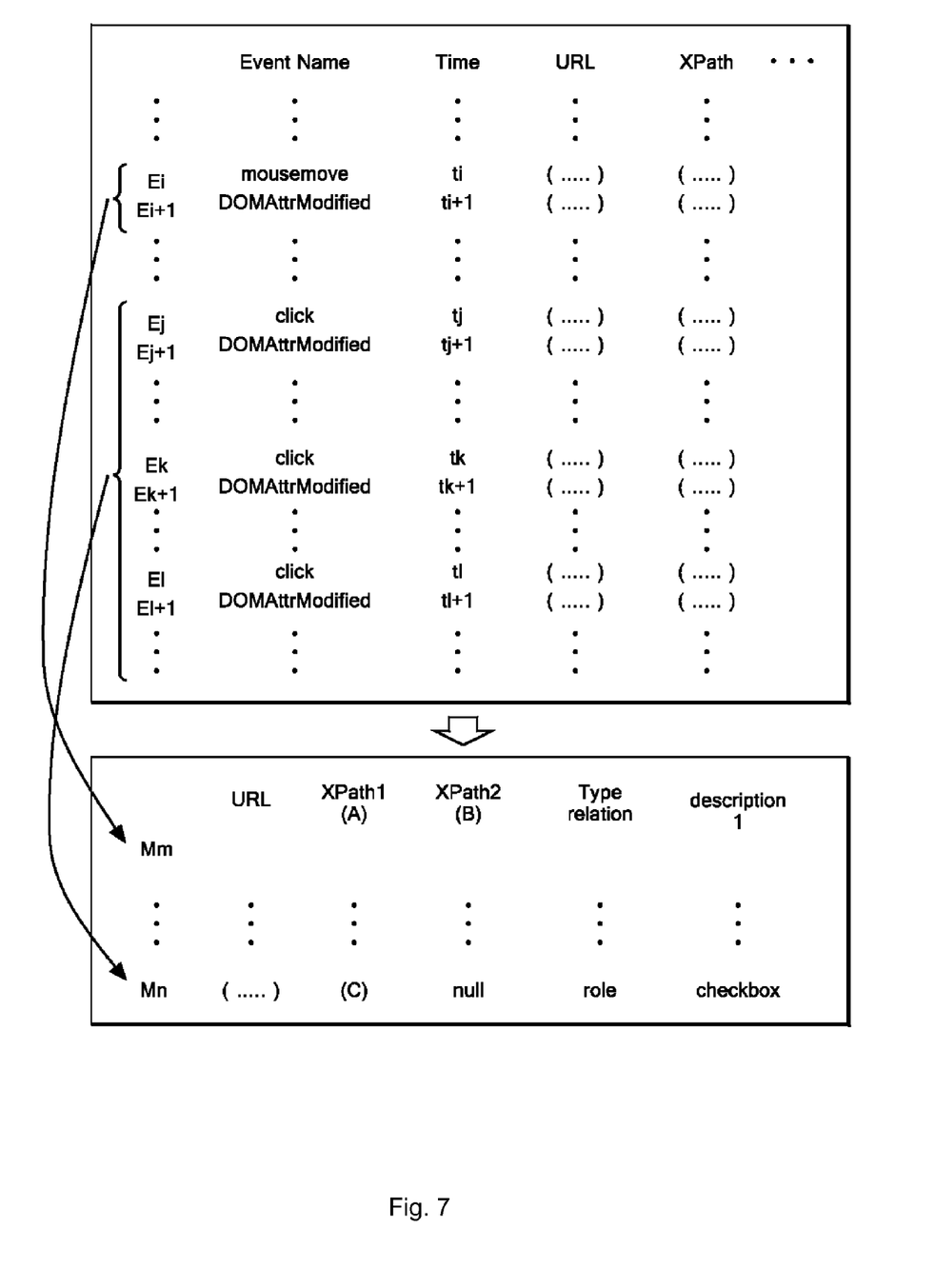
FIG. 7 shows events tracked by a tracer and metadata generated by an analyzer.

FIGS. 4 to 7 illustrate generation and registration of metadata. FIG. 4 is a timing chart showing an overall flow of metadata generation and registration; FIG. 5 shows how a user manipulates a dynamic menu (positioning a pointer on a menu item causes display of a submenu) as an illustration of metadata generation; FIG. 6 shows how a user manipulates a checkbox (clicking on the checkbox checks/unchecks the box) as an illustration of metadata generation; and FIG. 7 shows events tracked by the tracer 31 and metadata generated by the analyzer 32.

Referring to FIG. 4, a general client computer 1A(i) among the general client computers (clients) 1A(1) to 1A(m) sends a request to the web server 1C via the Internet 2 (arrow s1), and receives a web page transmitted by the web server 1C in response to the request (arrow s2). The web page contains multiple pieces of dynamic content. When the user performs some action on the web page, metadata is automatically generated without the user being aware of it and without requiring special operations or techniques (arrow s3). How metadata can be generated is described in detail below.

FIG. 5 shows a case where a dynamic menu is included in a web page. When the user places a pointer on the item "Books" (the item in box A) in the menu, items of the level below it, "Books", "Kindle", "Textbooks", and "Magazines & Newspapers" (items in box B), appear. In parallel with it, the tracer 31 receives and stores events Ei and Ei+1 from the operating system or the browser. As shown in FIG. 7, EventName, Time, URL, and Xpath are stored for each event. For example, as event Ei that corresponds to movement of the pointer by the user, EventName "mousemove", Time "ti", a URL "(omitted)", and Xpath "(a path indicating the portion A)" are stored. For event Ei+1 that corresponds to display of the lower-level items, EventName "DOMAttrModified", Time "ti+1", URL "(omitted)", and Xpath "(a path indicating portion B")" are stored. Thus, each time the user performs an action or there is a change in content, events are tracked and stored by the tracer 31.

Referring to FIG. 7, at certain time intervals, the analyzer 32 analyzes a sequence of such events and generates metadata. By way of example, if the time ti at which event Ei associated with the user's action occurred is compared with the time ti+1 at which the subsequent event Ei+1 occurred to find that their difference is smaller than a threshold, c, the analyzer 32 determines that event Ei+1 was caused by event Ei and generates metadata indicating it. If the difference between ti and ti+1 is equal to the threshold $\epsilon$ or greater, the analyzer 32 does not generate metadata. In this example, the difference is smaller than the threshold $\epsilon$ and metadata Mm is generated. For each metadata, a URL, Xpath1, Xpath2, type, and description are stored as shown in FIG. 7. By way of example, for metadata Mm which indicates that menu items of the lower level, "Books", "Kindle", "Textbooks", and "Magazines & Newspapers" (items in box B), appear when a user positions the pointer on the "Books" item (the item in box A), a URL "(omitted)", Xpath1 "(a path indicating portion A)", Xpath2 "(a path indicating portion B)", type "relation", and description "weight=1" are stored. Type "relation" means that the portions A and B of the web page have a relationship of "A controlling B", and description "weight=1" indicates that the metadata has been detected once.

FIG. 6 shows a case where checkboxes are included in a web page. When the user clicks on a checkbox (the portion in box C), the checkbox is unchecked and when the user clicks again, the checkbox is checked again. In parallel with it, the tracer 31 receives and stores events Ej, Ej+1, Ek, Ek+1, Ek, and Ek+1 from the operating system or browser. For each event, EventName, Time, URL, and Xpath are stored as in the aforementioned case. For example, for events Ej, Ek, and El that correspond to the user's clicks on the checkbox, EventName "click", Time "tj", "tk", "tl" respectively, a URL "(omitted)", and a Xpath "(a path indicating portion C)" are stored. For events Ej+1, Ek+1, and El+1 that correspond to checking and unchecking of the checkbox, EventName "DOMAttrModified", Time "tj+1", "tk+1", "tl+1" respectively, URL "(omitted)", and Xpath "(a path indicating portion C)" are stored. Thus, each time the user performs an action or there is a change in content, events are tracked and stored by the tracer 31.

At certain time intervals, the analyzer 32 analyzes a sequence of these events and generates metadata. For example, if the time tj at which event Ei associated with the user's action occurred is compared with the time tj+1 at which the subsequent event Ei+1 occurred to find that their difference is smaller than a threshold c, the analyzer 32 determines that event Ej+1 was caused by event Ej. The analyzer 32 similarly identifies that event Ek+1 was caused by event Ek and event El+1 was by event El. When such determination has been made at least a predetermined number of times (e.g., three times), the analyzer 32 generates metadata Mn indicating that the portion surrounded by box C is a checkbox. For metadata Mn indicating that the portion in box C is a checkbox, a URL "(omitted)", Xpath1 "(a path indicating portion C)", Xpath 2 "null", type "role", and description "checkbox" are stored. Type "role" indicates the role of portion C in the web page, and description "checkbox" means that the role is a checkbox.

The threshold value $\epsilon$ may be set as appropriate, e.g., to around 0.3 seconds. The threshold value $\epsilon$ may also be varied according to event E. For example, if an event requiring communication has occurred after event E associated with the user's action, the threshold value $\epsilon$ can be set to be longer (e.g., several seconds) than when such an event does not occur. If multiple event sequences (an event sequence is an event associated with the user's action and an event or events that occur within a certain time period after that event) are inconsistent with each other in terms of contents when metadata M is generated, an event sequence to be adopted may be determined by majority rule. Further, the URL and Xpath in metadata may be a wildcard URL and a wild Xpath (in which a part of the URL and path is represented by an arbitrary character string which is expressed as "*", for example). Such a configuration enables representation of metadata that can be applied page- or site-wide.

Tracking of events can be started and ended by the plug-in software 3 according to explicit indications from the user, for example. After event tracking ends, the client sends generated metadata M to the accessibility server 1D (arrow s4 in FIG. 4). The accessibility server 1D stores the metadata M in a database such that the metadata M can be transmitted in response to an external request. Although herein the client computer 1A(i) among the general client computers 1A(1) to 1A(m) generates metadata and sends it to the accessibility server 1D, this applies to the other general client computers 1A(1) to 1A(m) as well. In addition, while general client computers 1A(1) to 1A(m) generate metadata M in the description above, general client computers 1A(1) to 1A(m) may send the event E to the accessibility server 1B and the server 1B may generate metadata M from the event E.

Figure 8:
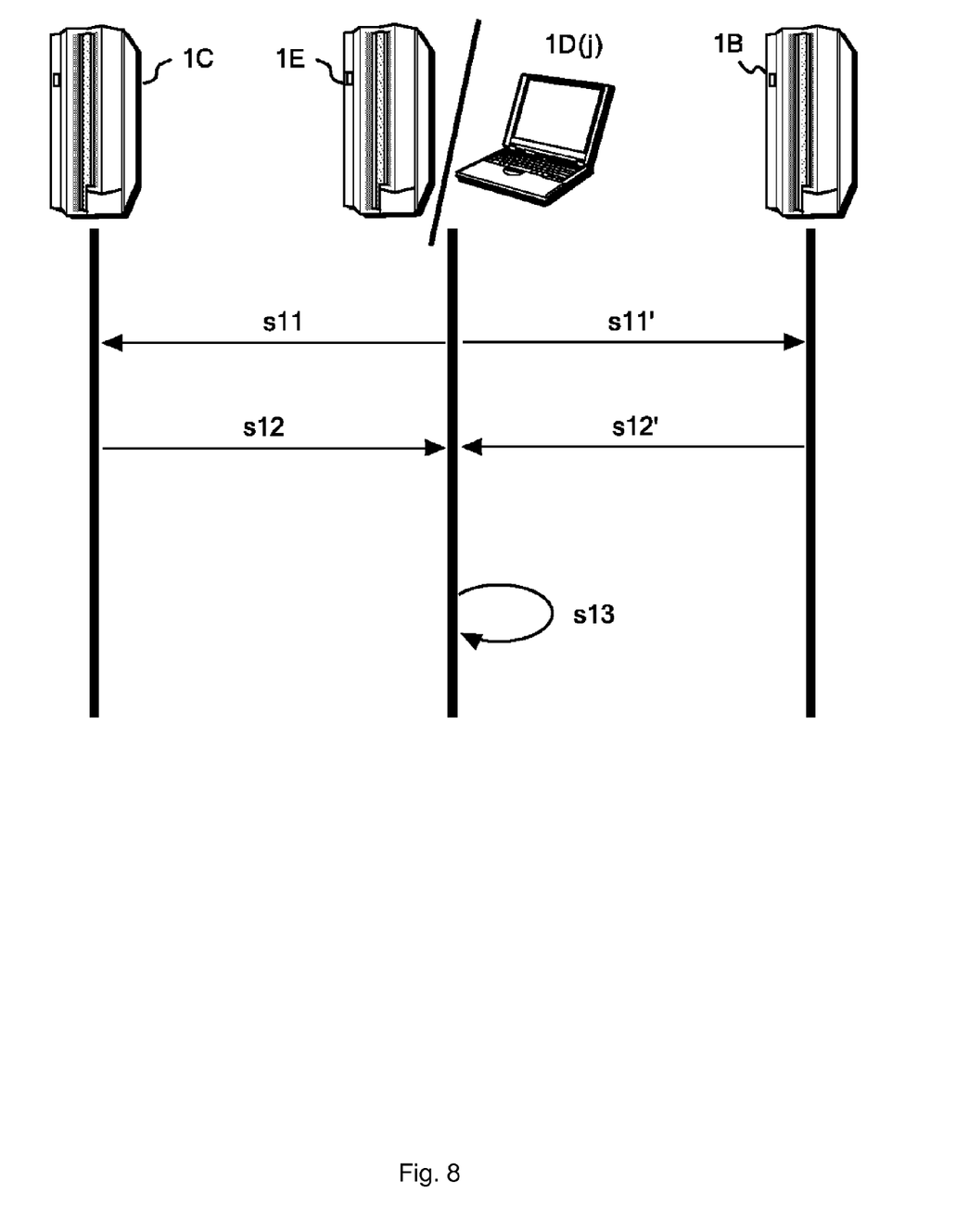
FIG. 8 is a timing chart showing an overall flow of metadata utilization.
Figure 9:
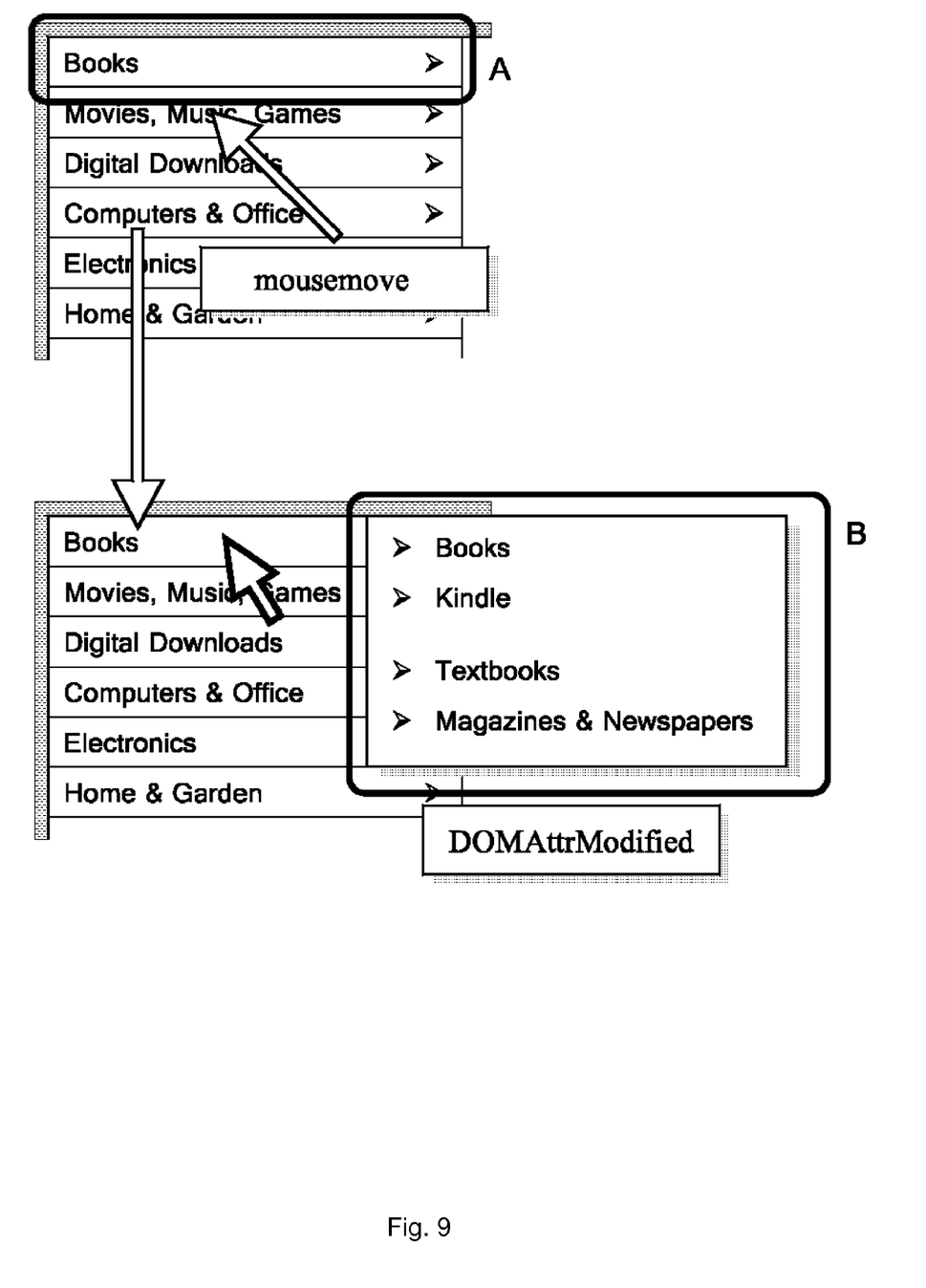
FIG. 9 illustrates the order of reading aloud a dynamic menu by a screen reader as an example of metadata utilization.

FIGS. 8 and 9 illustrate how metadata can be utilized. FIG. 8 is a timing chart showing an overall flow of metadata utilization, and FIG. 9 illustrates the order of reading aloud a dynamic menu (positioning of a pointer on a menu item causes display of a submenu) by a screen reader as an example of metadata utilization.

Referring to FIG. 8, a screen-reader client 1D(j) among screen-reader clients 1D(1) to 1D(n) sends a request to the web server 1C via the Internet 2 (arrow s11) and receives a web page transmitted by the web server 1C in response to the request (arrow s12). The screen-reader client 1D(j) also sends a request to the accessibility server 1B via the Internet 2 (arrow s11'). In response to the request, the accessibility server 1B sends metadata M corresponding to the web page and the client 1D(j) receives the metadata M (arrow s12'). The transcoder 51 of the client 1D(j) can use the metadata M to provide a user of the screen reader (e.g., a visually-impaired person) with a more accessible environment (arrow s13).

FIG. 9 illustrates reading aloud of a dynamic menu included in a web page using metadata Mn on the client D(j). For example, if the transcoder 51 is incorporated in the screen reader, the transcoder 51 can use metadata Mm to determine that in stead of "Movies, Music and Games", items positioned in the level under the "Books" item, i.e., "Books", "Kindle", "Textbooks", and "Magazines & Newspapers" (the items in box B) should be read after "Books" (the item in box A). This order of reading reflects the way of many general users browsing the Web. If the transcoder 51 is independent from the screen reader, the transcoder 51 still can direct the screen reader where to read next. Similarly, when reading a checkbox, a screen reader can explicitly tell that it is a checkbox by use of metadata Mn.

Metadata M can be used to realize correct order and contents of reading by a screen reader and also allow a web spider of the search server 1E to appropriately crawl web page contents and create indices for them. For example, for web content that should be newly downloaded from the web server 1C in response to an action by the user, information on the content can be appropriately acquired based on "relation" information in the corresponding metadata.

That which is claimed is:

1. A method involving a server connected with a client via a network, the method comprising the steps of:
   receiving from the client an action event indicative of an action performed by a user on content displayed on the client and a change event indicative of a change in the content; and
   generating metadata for improving accessibility to the content based on the action event and the change event;
   wherein the action performed by the user on the content is placing a pointer on the content, and the change in the content is that new content is displayed in addition to the content;
   wherein the content is an element of a hierarchical menu, and the new content is a submenu included in the element; and
   wherein the generating metadata comprises:
   determining a difference in time between occurrence of the action event and occurrence of the change event; and
   associating the action event and the change event together in the metadata only if the determined difference in time is smaller than a threshold;
   wherein the threshold equals one of: (a) first time, T1; and (b) a second time T2;
   wherein T1 is longer than T2;
   wherein T1 is used as the threshold if the change event requires communication and;
   wherein T2 is used as the threshold if the change event does not require communication.

2. The method according to claim 1, wherein the change event occurs in response to the action event.

3. The method according to claim 1, wherein the step of generating the metadata generates metadata that represents a relationship between the action event and the change event.

4. The method according to claim 1, wherein the step of generating the metadata generates the metadata based on a sequence of the action event and the change event.

5. The method according to claim 4, wherein the step of generating the metadata generates the metadata based on a sequence that has occurred more or most frequently among a plurality of sequences.

6. The method according to claim 1, wherein the step of generating the metadata generates metadata that indicates a type of the content.

7. The method according to claim 1, wherein
   the action performed by the user on the content is clicking on the content,
   the change in the content is a change in an attribute of the content, and
   the step of generating the metadata generates metadata which indicates that the content is a checkbox provided that the clicking and the change in the attribute have been repeated multiple times.

8. The method according to claim 1, wherein information identifying the content as a target is included in the metadata.

9. The method according to claim 8, wherein the information identifying the content includes a wildcard URL or a wildcard Xpath.

10. The method according to claim 1, wherein a separate computer is connected to the network, and the method further comprises the steps of:
    transmitting the metadata to the computer; and
    receiving the metadata from the computer in response to the client requesting the server to transmit the content.

11. The method according to claim 1, wherein the metadata improves accessibility to the content for a screen reader.

12. The method according to claim 1, wherein the metadata improves accessibility to the content for a web spider.

13. The method according to claim 1, wherein the client comprises a display device, a pointing device, and a communication device, and the method further comprises the steps of:
    displaying content transmitted from the server via the network on the display device through the communication device; and
    operating on the content displayed on the display device in response to the user manipulating the pointing device.

14. A method involving a client connected with a server via a network, the method comprising the steps of:
    tracking an action event indicative of an action performed by a user on content displayed on the client and a change event indicative of a change in the content; and
    generating metadata for improving accessibility to the content based on the action event and the change event;
    wherein the action performed by the user on the content is placing a pointer on the content, and the change in the content is that new content is displayed in addition to the content;
    wherein the content is an element of a hierarchical menu, and the new content is a submenu included in the element; and
    wherein the generating metadata comprises:
    determining a difference in time between occurrence of the action event and occurrence of the change event; and
    associating the action event and the change event together in the metadata only if the determined difference in time is smaller than a threshold;
    wherein the threshold equals one of: (a) first time, T1; and (b) a second time T2;
    wherein T1 is longer than T2;
    wherein T1 is used as the threshold if the change event requires communication and;
    wherein T2 is used as the threshold if the change event does not require communication.

15. An article of manufacture tangibly embodying computer readable non-transitory instructions which, when implemented, cause a server connected with a client via a network, to carry out the steps of a method comprising:
- receiving from the client an action event indicative of an action performed by a user on content displayed on the client and a change event indicative of a change in the content; and
- generating metadata for improving accessibility to the content based on the action event and the change event;
  - wherein the action performed by the user on the content is placing a pointer on the content, and the change in the content is that new content is displayed in addition to the content;
- wherein the content is an element of a hierarchical menu, and the new content is a submenu included in the element; and
- wherein the generating metadata comprises:
- determining a difference in time between occurrence of the action event and occurrence of the change event; and
- associating the action event and the change event together in the metadata only if the determined difference in time is smaller than a threshold;
- wherein the threshold equals one of: (a) first time, T1; and (b) a second time T2;
- wherein T1 is longer than T2;
- wherein T1 is used as the threshold if the change event requires communication and;
- wherein T2 is used as the threshold if the change event does not require communication.

* * * * *